No. 617,687. Patented Jan. 10, 1899.
A. KITSON.
VAPOR BURNING APPARATUS.
(Application filed Dec. 27, 1897.)
(No Model.)
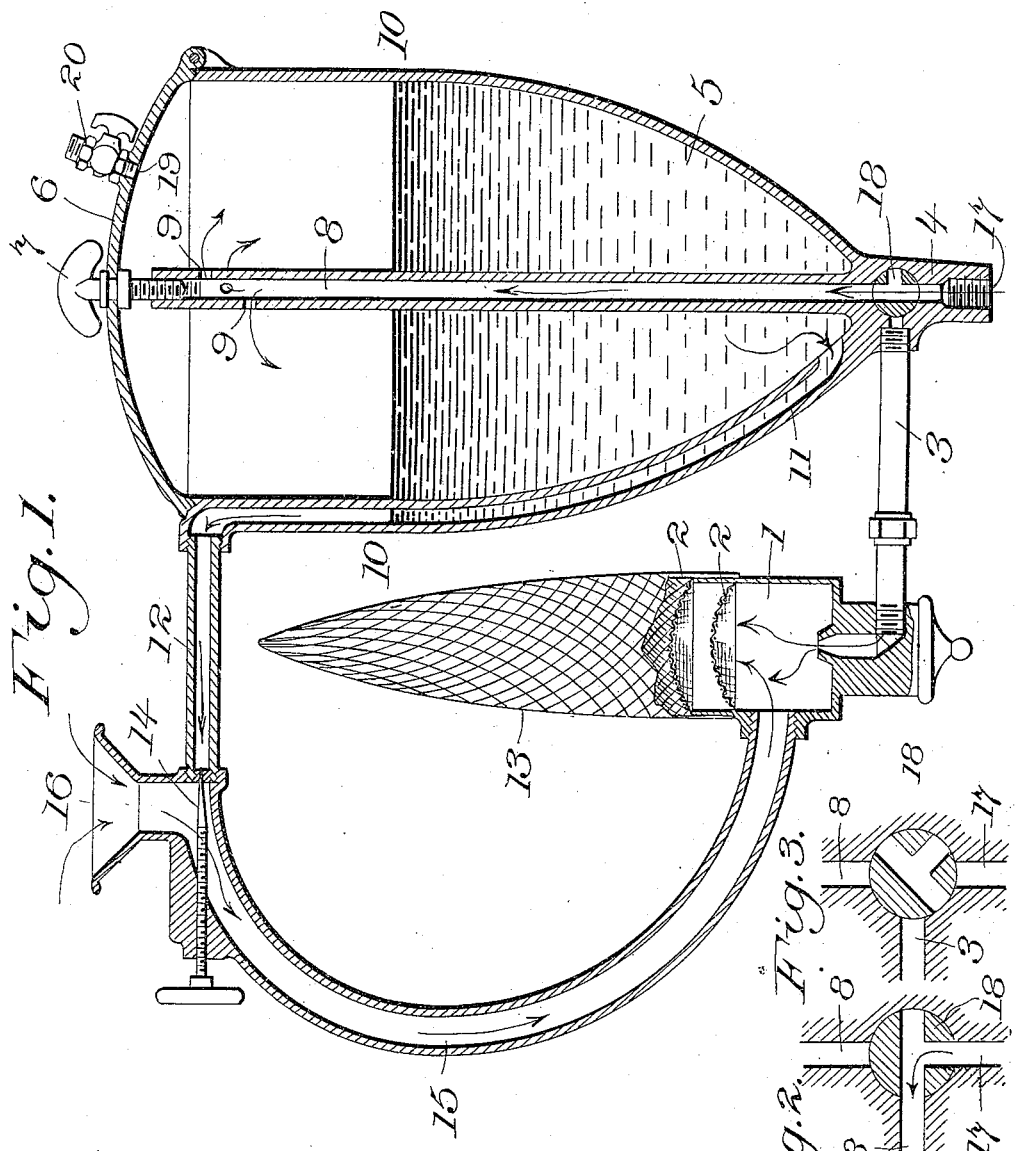

UNITED STATES PATENT OFFICE.

ARTHUR KITSON, OF PHILADELPHIA, PENNSYLVANIA, ASSIGNOR TO THE KITSON HYDROCARBON HEATING AND INCANDESCENT LIGHTING COMPANY, OF WEST VIRGINIA.

VAPOR-BURNING APPARATUS.

SPECIFICATION forming part of Letters Patent No. 617,687, dated January 10, 1899.

Application filed December 27, 1897. Serial No. 663,495. (No model.)

*To all whom it may concern:*

Be it known that I, ARTHUR KITSON, a subject of the Queen of Great Britain, residing at Philadelphia, in the county of Philadelphia and State of Pennsylvania, have invented certain new and useful Improvements in Vapor-Burning Apparatus; and I do hereby declare the following to be a full, clear, and exact description of the invention, such as will enable others skilled in the art to which it appertains to make and use the same.

My invention relates to vapor-burning apparatus, and more specifically consists of an improved form of lamp for consuming the vapor of kerosene or other hydrocarbon when mixed with a proper quantity of air, so as to burn with a blue or oxidizing flame. With this intensely-hot blue flame I employ a mantle of any suitable refractory material, which is heated to incandescence and gives off light-rays. The surplus heat-rays of the flame and the current of intensely-hot gases passing upward from the same heat a tube above the mantle, through which tube the oil passes and so vaporizes it, and in order to further perfect vaporization and utilize the radiant heat of the mantle I carry said vaporizing-tube up alongside the incandescent mantle.

The invention herein described and claimed is an improvement on that shown in Letters Patent of the United States granted to me July 3, 1888, No. 385,673, in that by the use of the incandescent mantle I can employ a blue flame and produce a more intense heat, and consequently produce more extensive and perfect vaporization, while the enriched gas or air of my Letters Patent above mentioned burned with a luminous flame of much less heat-giving capacity. The use of kerosene or other safe and cheap non-volatile hydrocarbon was difficult, if not impossible, in the apparatus described in said Letters Patent when mixed simply with air on account of the low temperature of the vaporizing-tube; but with the higher temperatures possible and required with the use of the incandescent mantle according to the invention herein described a perfect vaporization of the cheapest grades of kerosene is obtained.

The present invention further consists in special means for employing gas from an ordinary service system to produce the initial lighting of the lamp and to furnish the pressure to feed the oil after the vaporizing action has begun.

I do not broadly claim the construction embodying a vapor-burning apparatus mounted on a gas-bracket and provided with suitable connections for supplying gas for preliminary heating, as such is claimed in my pending application, Serial No. 649,008, filed August 21, 1897.

The preferred form of my apparatus is illustrated in the accompanying sheet of drawings, in which—

Figure 1 is a vertical section of the apparatus. Fig. 2 is a detail of the three-way valve in position to light the lamp. Fig. 3 is a similar detail showing the valve closed.

Throughout the drawings like reference-figures refer to like parts.

1 represents the burner, which may be of any form to consume the inflammable mixture supplied to it, but which preferably has the shape shown, employing the two partitions of wire-gauze 2 2, as shown. This burner is supported by the tubular arm 3, which extends from the valve-casing 4, which latter is provided with a thread or other connection for attaching it to any convenient gas-bracket. On the same is supported the reservoir 5 for containing the kerosene-oil or other fluid hydrocarbon, which is shown in the drawings filling the reservoir up to the dotted line 10 10.

6 is a hinged cover for the reservoir, which is held closed by means of the screw 7, which engages with the internal thread on the mouth of the vertical tube 8. 9 9, &c., are small holes in the upper end of said tube above the level 10 10 of the oil in the reservoir.

11 represents a tube opening from the bottom of the reservoir and carried up alongside of the mantle 13, which I mount over the burner 1. This mantle may be of any highly refractory substance, either of platinum wire or of the material employed in the modern Welsbach incandescent mantle. The tube 11 may be formed separate from the reservoir 5; but I have shown it cast integrally with the wall of said reservoir. The tube is also carried across above the incandescent mantle in the horizontal portion 12, which discharges by means of the needle-valve 14 into the mixing-tube 15, which extends down to the burner 1.

The mixing-tube has any suitable opening 16 for admitting air which is entrained by the jet issuing from the needle-valve in the proper quantity to produce a combustible mixture of air and vapor, which will burn with a blue flame at the burner 1.

The valve-casing 4 has a passage-way 17 opening into the gas-bracket, (said gas-bracket not being shown,) and said passage-way connects with the tubular arm 3 or the tube 8, according to the disposition made of the cut-off means provided for controlling such connections.

I preferably employ the three-way valve 18, which when in the position shown in Fig. 2 affords communication from the gas-bracket to the burner 1, or when in the position shown in Fig. 1 affords communication from the gas-bracket to the tube 8, or when in the position shown in Fig. 3 closes all three of said communicating passage-ways. 19 is a screw-threaded nipple provided with a valve 20 on the cover 6, through which a supply of compressed air may be forced into the upper portion of the reservoir 5 if it is desired to run the lamp with such source of pressure.

The method of operating my invention is as follows: The three-way valve being in the position shown in Fig. 2, the gas is admitted to the burner 1 and burns there with the assistance of a quantity of air admitted through the mixing-tube 15 and drawn in by the gas-jet discharged from the hollow supporting-arm 3. This flame heats the mantle 13 to incandescence, and the upward radiation of the heat and the current of the hot gases generated heats the vaporizing-tube 12, and also the heat radiated from the side of the mantle 13 heats the oil in the portion 11 of said tube alongside the mantle. When a sufficient amount of vapor has been generated in the tube, the needle-valve 14 is opened and the vapor escapes in the form of a jet into the mixing-tube 15, entraining a quantity of air therein, and this combustible mixture is thereby supplied to the burner 1. When the action of the burner becomes thus self-sustaining, the flow of gas through the tube 3 is shut off by turning the three-way valve 18 in the position shown in Fig. 1. The gas then enters the upper portion of the reservoir 5 and, exerting a pressure on the surface of the oil in said reservoir, continues to force the same into the vaporizing-tubes 11 and 12 to supply the place of the oil which is being vaporized therein.

In case a higher pressure is desired than that supplied by the gas in the service system with which the gas-bracket is connected the three-way valve 18 is turned in the position shown in Fig. 3 and compressed air is charged into the upper portion of the reservoir 5 through the nipple 19.

The lamp may be extinguished by closing the needle-valve 14 at any time and ignited again in the manner above described.

Of course when a charge of compressed air is in the upper portion of the reservoir it is unnecessary to admit gas thereto, and the lamp will be lighted by turning the three-way valve 18 from the position shown in Fig. 3 to that shown in Fig. 2. After the vaporizing-tube is sufficiently heated the needle-valve is opened and the three-way valve 18 will then be turned back to the position shown in Fig. 3.

In filling the reservoir the screw 7 is withdrawn from the mouth of the tube 8 and the cover 6 turned on its hinge to permit the pouring in of oil.

While I illustrate an incandescent mantle formed of platinum wire and used the same in the first specimens of the apparatus constructed and operated by me in accordance with this invention, I prefer to substitute in actual practice a mantle of the ordinary Welsbach type. It is also evident that separate cut-off means controlling the various passages might be substituted for the three-way valve 18, which controls all of them, without departing from the spirit and scope of my invention. Other arrangements of the vaporizing-tube might also be employed. It might be found sufficient in some cases to employ only the horizontal portion 12 above the incandescent mantle, while in other cases the portion 11, extending up alongside of the mantle, might suffice without employing the upper horizontal portion; but the employment of both sections in the manner illustrated and described secures the most perfect utilization of the heat for vaporizing purposes.

The shape of the mixing-tube 15, in the form of a curve devoid of sharp angles or corners, is an important subsidiary feature of my invention, in that it permits a free and unobstructed flow of the mixed air and vapor to the burner. The injector action of the jet of vapor being the only force acting to deliver the comparatively large quantity of air mixed with the vapor to the burner, it is important to put the least possible amount of obstructions in the path of such mixture of air and vapor during its passage through the mixing-tube to the burner. This can only be brought about by making all bends in the mixing-tube in the shape of curves of as large radius as possible and avoiding all sharp corners or angles.

Having therefore described my invention, what I claim as new, and desire to protect by Letters Patent, is—

1. In a vapor-burning apparatus, the combination of the burner, the mixing-tube connected thereto, the incandescent mantle, and the vaporizing-tube located in the heating zone of said mantle, substantially as described.

2. In a vapor-burning apparatus, the combination of the burner, the oil-reservoir, connections between the burner and the lower part of the oil-reservoir, the gas-bracket, and means whereby the pressure of the gas delivered through the gas-bracket may be applied to the surface of the oil in the reservoir, and above the burner connection, substantially as described.

3. In a vapor-burning apparatus, the combination of the burner, the oil-reservoir, the gas-bracket, connections from the lower part of the reservoir to the burner, from the gas-bracket to the burner, and from the gas-bracket to the upper part of the oil-reservoir, and cut-off means controlling said connections, substantially as described.

4. In a vapor-burning apparatus the combination with the burner, the oil-reservoir, the gas-bracket on which the apparatus is mounted, connections from the lower part of the reservoir to the burner, from the gas-bracket to the burner, and from the gas-bracket to the upper part of the oil-reservoir, and a three-way valve controlling said connections, substantially as described.

5. In a vapor-burning apparatus the combination of the burner and connections, the incandescent mantle therefor, the oil-reservoir and the vaporizing-tube included in the connections between the reservoir and the burner and extending up alongside the incandescent mantle, substantially as described.

6. In a vapor-burning apparatus the combination of the burner and connections, the incandescent mantle therefor, the oil-reservoir and the vaporizing-tube included in the connections between the reservoir and the burner, and extending up alongside of and over the top of the incandescent mantle, substantially as described.

7. In a vapor-burning apparatus the combination of the vapor-burner, an incandescent mantle therefor, an oil-supply, a vaporizing-tube located within the heating zone of the burner, and in the line of connections from the oil-supply to the burner, and means for mixing air with the oil-vapor prior to its delivery to the burner, substantially as described.

8. In a vapor-burning apparatus the combination of the vapor-burner provided with one or more diaphragms of wire-gauze, an incandescent mantle therefor, an oil-supply and vaporizing-tube located within the heating zone of the burner and in the line of connections from the oil-supply to the burner, and means for mixing air with the oil-vapor prior to its delivery to the burner, substantially as described.

9. In a vapor-burning apparatus the combination of the cylindrical vapor-burner provided with one or more diaphragms of wire-gauze arranged transversely to the axis of the burner, an incandescent mantle therefor, an oil-supply and vaporizing-tube located within the heating zone of the burner and in the line of connections from the oil-supply to the burner, and means for mixing air with the oil-vapor prior to its delivery to the burner, substantially as described.

10. In a vapor-burning apparatus the combination of the burner, the mixing-tube connected thereto, the incandescent mantle therefor, the oil-reservoir and the vaporizing-tube included in the connections between the reservoir and the mixing-tube, and extending up alongside the incandescent mantle, substantially as described.

11. In a vapor-burning apparatus, the combination of the burner, the mixing-tube connected thereto, the incandescent mantle therefor, the oil-reservoir and the vaporizing-tube included in the connections between the reservoir and the mixing-tube, and extending up alongside of and over the top of the incandescent mantle, substantially as described.

12. In a vapor-burning apparatus, the combination of the vapor-burner provided with one or more diaphragms of wire-gauze, the incandescent mantle therefor, a vaporizing-tube located in the heating zone of the burner and mantle, and the mixing-tube connected to the burner and having its mouth opposite the discharge end of the vaporizing-tube, said mixing-tube being curved but devoid of angles throughout its entire length, substantially as described.

In testimony whereof I affix my signature in presence of two witnesses.

ARTHUR KITSON.

Witnesses:
A. PARKER SMITH,
LILIAN FOSTER.